Aug. 6, 1940.   A. R. COLLEY ET AL   2,210,065
CASH REGISTER
Original Filed Nov. 25, 1936    4 Sheets-Sheet 1

Arthur R. Colley
and John B. Geers
Inventors

By Carl Benst
Their Attorney

Aug. 6, 1940.  A. R. COLLEY ET AL  2,210,065
CASH REGISTER
Original Filed Nov. 25, 1936  4 Sheets-Sheet 2
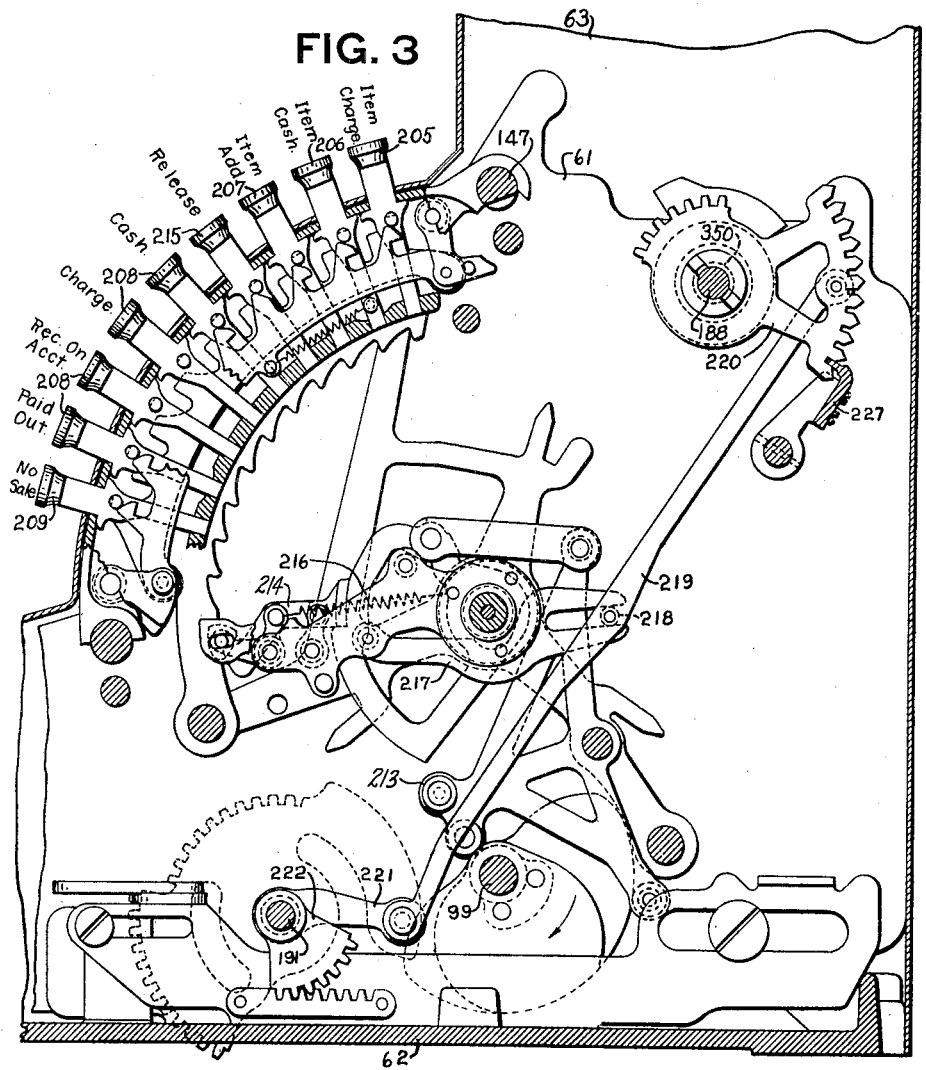
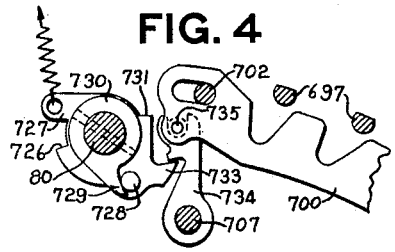
Arthur R. Colley
and John B. Geers
Inventors
By Carl Benst
Their Attorney Aug. 6, 1940.  A. R. COLLEY ET AL  2,210,065
CASH REGISTER
Original Filed Nov. 25, 1936     4 Sheets-Sheet 3

Arthur R. Colley
and John B. Geers
Inventors

By Earl Beust
Their Attorney

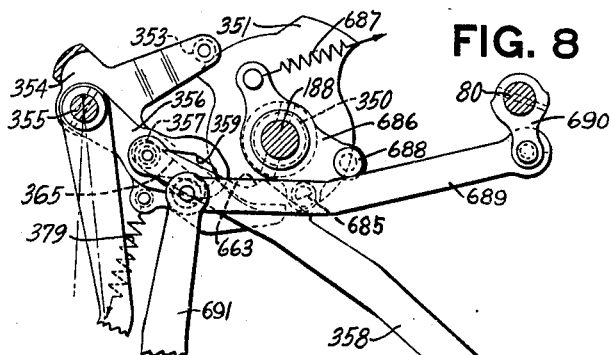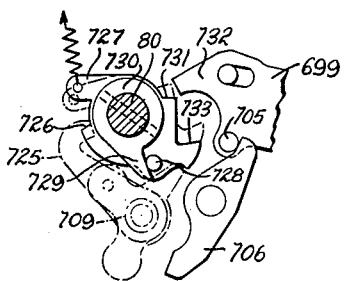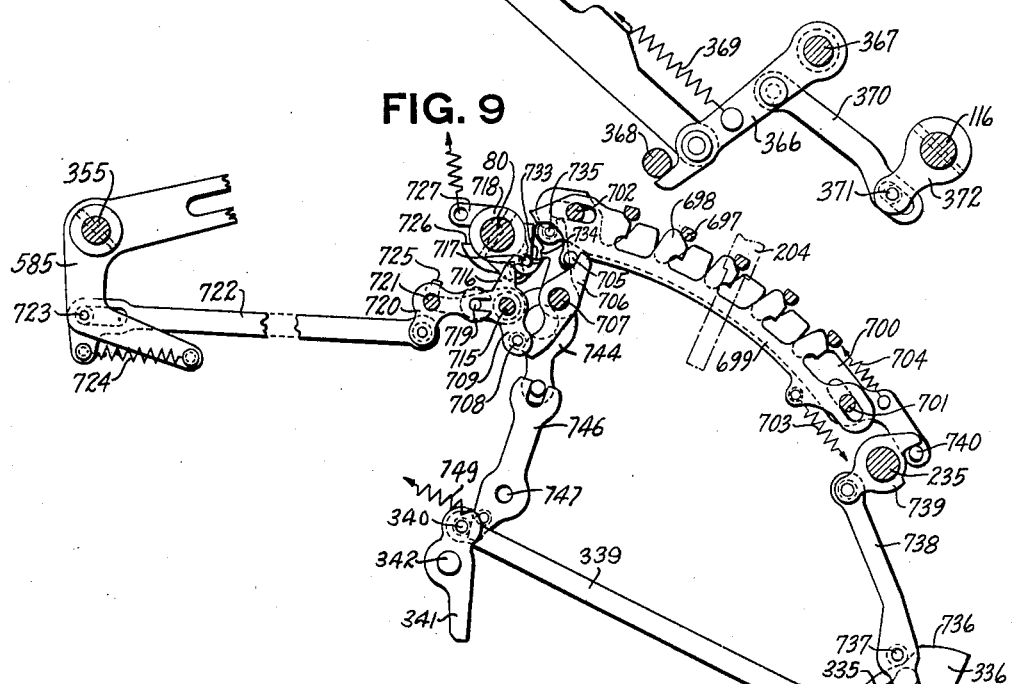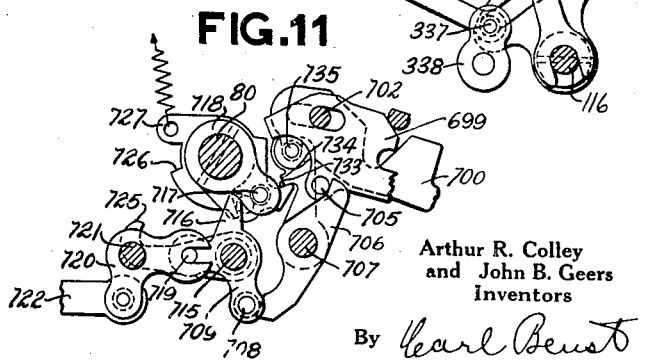

Patented Aug. 6, 1940

2,210,065

UNITED STATES PATENT OFFICE 2,210,065

CASH REGISTER

Arthur R. Colley and John B. Geers, Dayton, Ohio, assignors to The National Cash Register Company, Dayton, Ohio, a corporation of Maryland (1926)

Original application November 25, 1936, Serial No. 112,656. Divided and this application November 18, 1938, Serial No. 241,102

4 Claims. (Cl. 235—7)

This invention relates to cash registers and like machines and is particularly directed to machines of the class illustrated and described in Letters Patent of the United States No. 1,619,796, granted March 1, 1927, to B. M. Shipley, and Patents Nos. 1,817,883 and 1,865,147, issued respectively August 4, 1931, and June 28, 1932, to B. M. Shipley. This application is a division of application Serial No. 112,656, which was filed on November 25, 1936.

An object of the invention is to provide novel interlocking means for certain keys, and means to control the operation of the interlocking means in various kinds of machine operations.

Another object of this invention is to provide for various interlocks to enforce the proper operation of the machine.

Another object is to provide novel means, effective in multiple-item transactions, to control the depression and release of certain control keys.

A still further object of this invention is to provide novel mechanism for controlling the releasing and retaining of certain control keys in single- and multiple-item transactions.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 3 is a sectional view of the machine as observed from the right, and illustrates in particular the transaction bank and its associated differential mechanism.

Fig. 4 is a detail of the interlock between the clerk's bank and the machine-releasing mechanism.

Fig. 8 is a left side view of the single-item and multiple-item controlling mechanism.

Fig. 9 is a left side elevation showing the mechanism for preventing the release of the clerks' keys during multiple-item transactions, and the mechanism for unlocking the machine-releasing mechanism when the total control lever is moved away from adding position.

Fig. 10 is a detail view of a part of the mechanism for controlling the depression and the release of the clerks' keys.

Fig. 11 is an enlarged detail view of certain of the mechanism shown in Fig. 9.

GENERAL DESCRIPTION

The machine embodying this invention is arranged to perform single-item and multiple-item transactions. A single-item transaction consists of the entering of a single item in the selected transaction and clerk's totalizers and the printing of this item upon both the body and the stub of an issuing receipt.

A multiple-item transaction consists of a series of item-entering operations followed by an enforced clearing operation. During the item-entering operations, the items are accumulated in the multiple-item totalizer as well as in the proper transaction and clerk's totalizers and simultaneously the amount of each item is printed upon the main portion or body of the receipt. In the enforced clearing operation following a series of multiple-item entering operations, the multiple-item totalizer is reset to zero and the total is printed upon the main portion and the stub of the receipt.

In machines performing these operations, it is highly desirable that various keys should be operated in certain operations and be blocked against operation in others. It is also necessary that keys be released in certain operations and retained depressed in other operations. Novel mechanisms have been provided to insure that the keys will be locked and released under the proper conditions, and these mechanisms form the subject matter of this divisional application.

More specifically, the novel mechanisms comprise means variously operable in single-item, multiple-item, and multiple-item total operations for causing certain keys, such as the clerks' keys, to be released after each single-item transaction; to be retained depressed during the several multiple-item entering operations and to prevent any other like control key from being depressed during these entering operations; and to release the depressed key during a multiple-item total operation.

DETAILED DESCRIPTION

The mechanism of the present invention is embodied in the well-known type of cash register fully disclosed in the patents referred to at the beginning of this specification. For this reason, mechanism of standard construction which is not pertinent to the present invention will be but briefly described.

Machine framework

Most of the mechanism of the instant machine is supported between a right frame 60 (Fig. 7) and a left frame 61 (Fig. 2), both of which are secured to a machine base 62. The entire machine is enclosed by a suitable case or cabinet 63.

Operating mechanism

Figure 6:
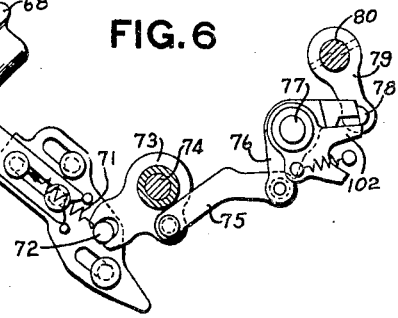
Fig. 6 is a detail view of the mechanism for initiating operation of the machine.
Figure 7:
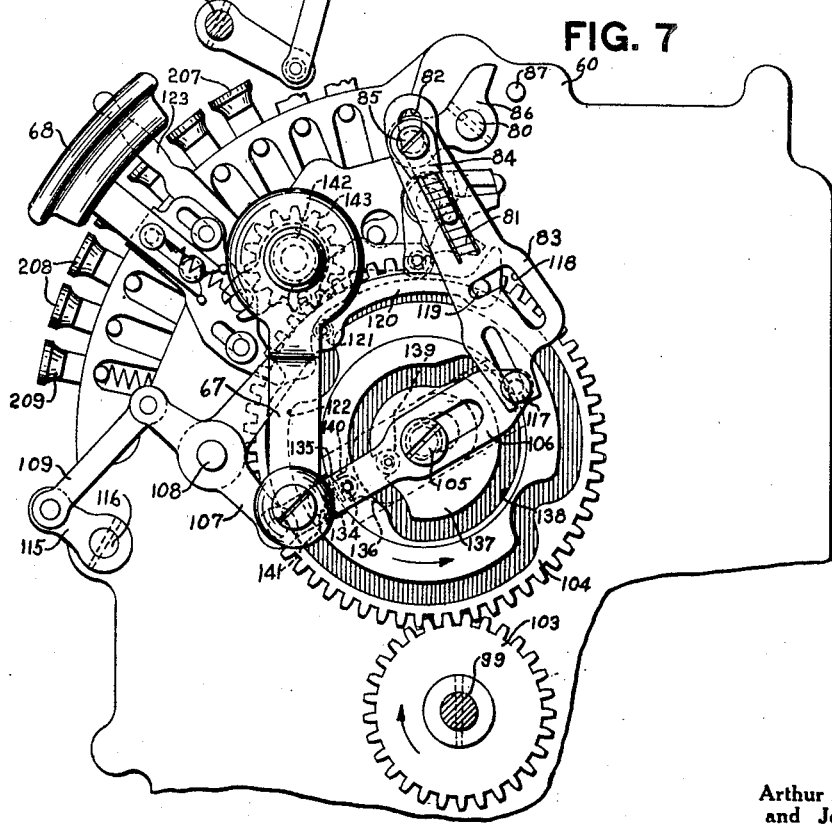
Fig. 7 is an elevation of the right-hand end of the machine showing the transaction bank, the machine-releasing mechanism, and the cycle-controlling mechanism.

The machine of the instant invention is preferably operated by means of a suitable electric motor (not shown). However, if desired, or if rendered necessary by failure of the electrical current, the machine may be manually operated by means of a crank 67 (Fig. 7). Whether the machine is operated electrically or manually, the operation is initiated by depression of a starting bar 68 (Figs. 6 and 7). Depressing the starting bar 68, by means of a stud 72 carried thereby in cooperation with the bifurcated end of a crank 73, rocks said crank counter-clockwise on its pivot 74 secured in the frame 60. Counter-clockwise movement of the crank 73 by means of a connecting link 75 imparts similar movement to a release pawl 76 loosely supported on a shaft 77, opposite ends of which are journaled in the frames 60 and 61.

Counter-clockwise movement of the release pawl 76 moves the rearward end thereof out of the path of an arcuate surface on a half-round stud 78 secured in the lower end of a crank 79 fast to a key lock shaft 80 journaled in the frames 60 and 61. This releases the key lock shaft 80 to the action of a compression spring 81 (Fig. 7), which imparts a slight clockwise movement to said shaft 80. The spring 81 fits loosely over a tongue in a slot 82 in a key release link 83, and over a tongue on a link 84, the upper end of which is loosely supported on a stud 85 secured in one arm of a crank 86 secured on the right-hand end of the key lock shaft 80. It is therefore obvious, from observing Figs. 6 and 7, that, when the release pawl 76 retains the key lock shaft 80 in untripped position, the spring 81 is compressed, and as soon as said release pawl is moved out of the path of the stud 78 by depressing starting bar 68, the spring 81 immediately rocks the key lock shaft 80 clockwise until such movement is terminated by an extension of the crank 86 contacting a stud 87 secured in the frame 60.

Clockwise movement of the shaft 80 closes the motor switch and causes the motor to be clutched to the machine to drive the main shaft 99 and other mechanisms in the machine which form no part of this invention.

Operation of the motor rotates the main drive shaft 99 clockwise, as viewed in Figs. 3 and 7, one revolution in adding operations and two revolutions in total-taking operations. After the shaft 99 has completed the necessary number of revolutions to effect the type of operation being performed, the key lock shaft 80 (Figs. 6 and 7) is restored counterclockwise to untripped position, thus permitting the spring 71 to return the starting bar 68 upwardly and the release pawl 76 clockwise into the path of the stud 78 to restrain releasing movement of the shaft 80. The restoring of the key lock shaft 80 is effected by the cycle-controlling mechanism shown in Fig. 7, which will be explained later.

In case the operator accidentally or inadvertently retains the starting bar 68 (Figs. 6 and 7) depressed at the end of a machine operation, a repeat operation of the machine is prevented by means of a non-repeat pawl 102 fulcrumed on the shaft 77, said pawl being spring-urged into the path of the stud 78, upon restoration of the key lock shaft, to obstruct releasing movement of said shaft. This prevents the machine from being again set in motion until the starting bar 68 is released and returned upwardly by the spring 71. Upon restoration of the starting bar 68 to undepressed position, a rearward extension of the pawl 76, which overlies the non-repeat pawl 102, returns said pawl clockwise to ineffective position as said pawl 76 is returned into the path of the stud 78. The non-repeat pawl 102 is slightly longer than the release pawl 76, which prevents said pawl 76 from stumbling on the stud 78 upon restoration of the starting bar 68 and causes said stud 78 to obstruct counter-clockwise movement of the pawl 102 to prevent said pawl from interfering with the clockwise releasing movement of the key lock shaft 80.

Cycle-controlling mechanism

In adding operations, the main drive shaft 99 makes one cycle of movement, or one revolution clockwise, as viewed in Figs. 3 and 7, and in total-taking operations, said main drive shaft makes two revolutions or two cycles of movement. Revolution of the shaft 99 is governed by means of a cycle-controlling mechanism shown in Fig. 7 and now to be described.

Secured on the right-hand end of the main drive shaft 99 (Fig. 7) is a gear 103, which meshes with a large gear 104 fulcrumed on a stud 105 fast in the frame 60. A pitman 106 is slotted to embrace the stud 105 and is pivotally connected at its lower end to one arm of a lever 107 loose on a stud 108 fast in the frame 60. A link 109 connects another arm of the lever 107 to a crank 115 secured on the right-hand end of a zero stop throwout shaft 116 journaled in the frames 60 and 61. The zero stop throwout shaft 116 functions only in total-taking operations.

The pitman 106 carries a stud 117 embraced by the lower bifurcated end of the key release link 83. The upper end of the key release link 83 is slotted to receive the stud 85, as explained earlier herein. The link 83 has an L-shaped slot 118, which cooperates with a stud 119 in a key release lever 120, fulcrumed on the stud 108, and carrying a roller 121 which extends within a cam groove 122 in the face of the gear 104.

Figure 5:
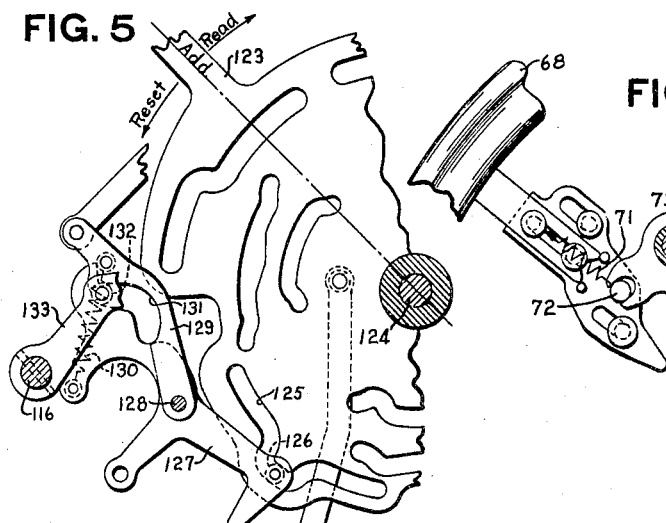
Fig. 5 is a fragmentary detail view of the total control lever and a part of the mechanism associated therewith.

The functions of the machine—adding, reading, and resetting—are controlled by means of a total control lever or plate 123 (Fig. 5) pivoted on a stud 124, extending between two support plates (not shown) mounted on rods extending between the frames 60 and 61. When the total control lever 123 is in adding position, as here shown, the link 83 is positioned as shown in Fig. 7, so that the forward branch of the slot 118 engages the stud 119.

In adding operations, the main drive shaft 99 and the gear 103 make one clockwise revolution and the gear 104 is driven one-half of a revolution in a counter-clockwise direction by said gear 103. The groove 122 in the gear 104 is concentric with the center 105 with the exception of two identical diametrically opposed camming sections thereof. Near the end of an adding operation, one of the camming sections of the groove 122, in cooperation with the roller 121, rocks the lever 120 first clockwise and then back to normal position. Clockwise movement of the lever 120 moves the link 83 downwardly, which, by means of the stud 85 in the arm 86, imparts counter-clockwise movement to the key lock shaft 80 to restore said shaft to untripped position in the manner explained earlier herein. Restoring movement of the shaft 80 also releases the depressed amount, transaction, and clerks' keys; opens the switch to the electric motor; and disengages the clutch mechanism which connects the motor to the machine mechanism.

In reading or resetting operations, the main drive shaft 99 makes two clockwise revolutions in order to operate the machine through the two cycles of movement necessary in total-taking operations. This is effected in the following manner:

Moving the total control lever 123 (Fig. 5) away from adding position to either reading or resetting position causes a camming slot 125 therein, in cooperation with a stud 126 in a lever 127 pivoted at 128, to rock said lever 127 counter-clockwise. Loose on the pivot 128 is an arm 129 carrying a stud which is normally maintained in contact with an upward extension of the lever 127 by a spring 130, thus forming a flexible connection between said arm 129 and said lever 127. Substantially one-half of a camming slot 131 is formed in the arm 129 and the other half in the lever 127, said slot being arranged to cooperate with a roller 132 carried by an arm 133 secured to the zero stop throwout shaft 116. The slot 131, in cooperation with the roller 132, rocks the shaft 116 a slight distance clockwise when the lever 127 is rocked counter-clockwise by shifting the total control lever 123 away from adding position, as explained above. Clockwise movement of the shaft 116, by means of the arm 115 and the link 109 (Fig. 7), rocks the lever 107 clockwise to shift the pitman 106 forwardly. Forward movement of the pitman 106 shifts the link 83 a slight distance clockwise but not sufficiently to move the forward branch of the slot 118 out of engagement with the stud 119.

The pitman 106 carries two studs 134, which straddle a right-angled projection 135 of a slide 136 loose in an angular slot in the back face of a cam 137 loose in a recess in the face of the gear 104 and rotatable on the stud 105. The cam 137 has a cam groove 138 adapted to cooperate with a roller 139 carried by the pitman 106. A nose 140 of the slide 136 is arranged to engage a recess 141 in the gear 104 to lock the cam 137 to said gear in total-taking operations.

When the total control lever 123 is in adding position, the pitman 106 is in the position shown in Fig. 7, in which position the nose 140 of the slide 136 is disengaged from the recess 141 and the roller 139 is moved out of the camming groove 138 into engagement with a notch in the heart of the cam 137 to retain said cam stationary. Moving the total control lever away from adding position imparts clockwise movement to the shaft 116 and the lever 107 to shift the pitman 106 forwardly in the manner explained above. Forward movement of the pitman 106, in addition to moving the link 83, shifts the slide 136 forwardly to engage the nose 140 thereof with the recess 141 to lock the cam 137 to the gear 104. Forward movement of the pitman 106 likewise disengages the roller 139 from the notch in the heart of the cam 137 and moves said roller into the cam groove 138. Depressing the starting bar 68 sets the machine in motion for a total-taking operation.

Near the end of the first clockwise revolution or first cycle of movement of the shaft 99, the cam groove 138 shifts the pitman 106 an additional distance forwardly to move the downwardly-extending portion of the slot 118 in the link 83 opposite the stud 119. This provides clearance for said stud and permits the irregular portion of the groove 122, in cooperation with the roller 121, to rock the lever 120 idly back and forth without imparting downward releasing and restoring movement to the link 83 and the key lock shaft 80. This prevents the opening of the switch to the motor and the disengaging of the clutch mechanism and the releasing of the keys, thus causing the machine to begin another cycle.

Near the end of the second cycle of operation, the groove 138 returns the pitman 106 rearwardly to re-engage the forward branch of the slot 118 with the stud 119. It is, therefore, obvious that when the second irregular portion of the slot 122 imparts clockwise movement to the lever 120, said lever will move the link 83 downwardly to restore the key lock shaft 80 counter-clockwise to terminate operation of the machine and to release the depressed clerk or transaction key. Return movement counter-clockwise of the lever 120 and the link 83 permits the stud 78 (Fig. 6) to come to rest against the end of the release pawl 76. The link 83 continues to travel upwardly a slight distance independently of the shaft 80 and the stud 85 to compress the spring 81 and to provide clearance for said stud 85, to permit clockwise releasing movement of the shaft 80 when the starting bar 68 is again depressed. Returning the total control lever to adding position disengages the slide 136 from the recess 141 and re-engages the roller 139 with the notch in the heart of the cam 137. As previously stated, the machine may be operated manually by means of the crank 67 (Fig. 7). The crank 67 carries a stud which is journaled in a bushing 142 secured to the frame 69. Integral with the crank 67 is a pinion 143, which meshes with the gear 104, thus providing a means for rotating the main drive shaft 99 manually.

*Amount keys and amount differentials*

The details of the amount keys and amount differentials form no part of this invention and will not be described herein. A complete description of this mechanism is given in the parent case, to which reference may be had for details of this mechanism.

*Totalizers and transaction keys*

Figure 1:
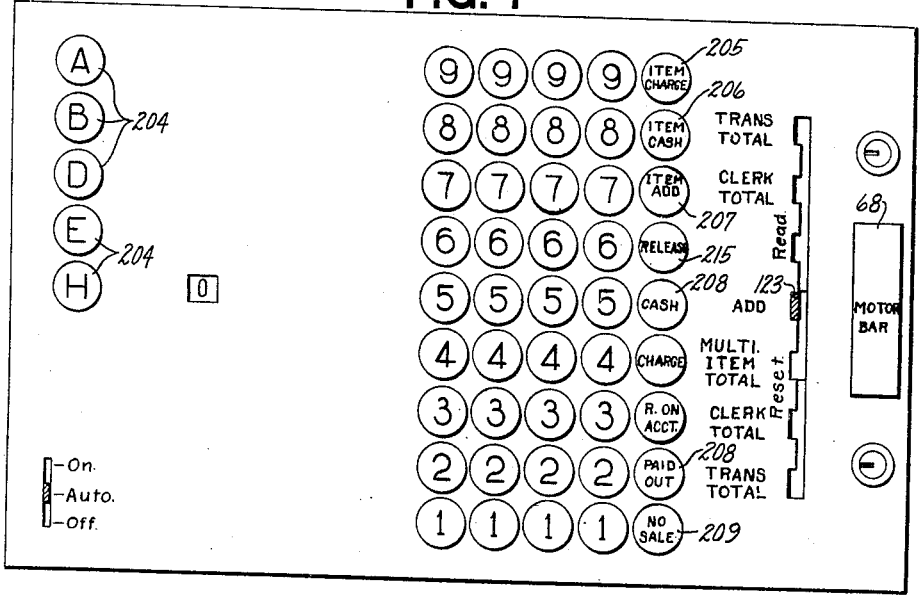
Fig. 1 is a plan view of the keyboard of the machine embodying the instant invention.

The machine embodying this invention has three lines of totalizers; namely, a #1 or multiple-item line, a #2 or clerks' line, and a #3 or transaction line. The #1 totalizer line has one set of wheels and is used in multiple-item operations to accumulate the total amount of a plurality of items. The #2 line has five sets of wheels selected by means of a row of corresponding clerks' keys 204 (Figs. 1 and 2) to accumulate totals of "Cash" and "Received-on-account" transactions. The #3 totalizer line has four sets of wheels, selected by means of a row of transaction keys 205, 206, 207, 208, 209, and 215 (Figs. 1 and 3).

These totalizer lines are not shown herein, as they form no part of the instant invention. Reference may be had to the parent case for further details of the totalizers.

The keys of the transaction bank are divided into two groups. One of said groups consists of three multiple-item keys; namely, an Item charge key 205, an Item cash key 206, and an Item add key 207. The other group of transaction keys consists of four single-item keys; namely, Cash, Charge, Received-on-account, and Paid out. The bank of transaction keys also includes a No-sale key 209 and a Release key 215.

Depressing one of the transaction keys moves the lower end of the stem thereof into the path of a latch 214 to control a differential device 216, and upon operation of the machine, the differential moves the latch 214 into engagement with the stem of the depressed transaction key, which breaks the latch of the transaction differential in a position corresponding to said key. The differential 216 has the usual beam 217 positioned commensurate therewith, and said differential positioning is transmitted to link 219 through a bifurcated end of said beam cooperating with a stud 218 in said link 219 and moving said link 219 when the roller 213 engages the beam 217.

The upper end of the link 219 is pivotally connected to an indicator segment 220 loose on the indicator shaft 188, and the lower end of said link 219 is pivotally connected to an arm 221, secured to a segment 222 loose on the shaft 191. The operation of segment 222 (Fig. 3) does not enter into the instant invention and will not be described in this application.

The beam 217 and the link 219 differentially position the transaction indicator segment 220 and its associated indicator commensurate with the depressed transaction key. An indicator aliner 227 (Fig. 3), in cooperation with alining teeth in the transaction indicator segment 220, retains said segment and its associated mechanism in set position during a machine operation.

*Clerks' keys and differential mechanism therefor*

As previously stated, the machine embodying this invention has a row of clerks' keys 204 (Figs. 1 and 2) located on the extreme left-hand side of the keyboard. These keys are used to select corresponding sets of totalizer wheels on the No. 2 or clerks' totalizer line for either adding or total-taking operations. An interlocking mechanism between the total control lever, the clerks' keys, and the machine releasing mechanism makes it necessary to depress one of the clerks' keys before the machine can be released for adding operations. However, this interlocking mechanism is rendered ineffective in total-taking operations. In single-item transactions the clerks' keys are released near the end of each operation, while in multiple-item transactions the depressed clerk's keys remains depressed during the item-entering operations and is released in the final compulsory multiple-item clearing operation.

The clerks' keys 204 are mounted in a frame 234 supported by the rod 147 and a stud 235. Depressing one of the clerks' keys 204 moves the lower end thereof into the path of a projection 236 of a differential control lever 237 loose on a stud 238 in the left frame 61. The details of the clerks' bank differential form no part of this invention and will not be described herein. This mechanism is described in detail in the parent case, to which reference may be had for these details.

*Single- and multiple-item transaction control mechanism*

As stated previously, the machine embodying the present invention is capable of single-item and multiple-item transactions. A single-item transaction is one in which one item is entered in a single operation of the machine, and a multiple-item transaction is one in which several items are entered in as many operations of the machine, all of said items being entered under one transaction heading, such as "Item cash" or "Item charge." Each multiple-item transaction includes a final clearing operation in which the multiple-item or #1 totalizer is cleared or reset.

The indicator segment 220 (Fig. 3), which is differentially positioned under control of the transaction keys, as explained previously, is operatively connected by a tube 350 rotatably supported by the indicator shaft 188 to a plate cam 351 (Fig. 8), the periphery of which is adapted to cooperate with a roller 353 in one arm of a yoke 354 turnably mounted on a shaft 355 journaled in the frame 61 and a printer frame shown in the parent case but not shown herein. The yoke 354 is operatively connected to an arm 356, secured on the shaft 355, by means of a roller 357 in a link 358, which roller extends through a slot 359 in said arm 356 and a slot 365 in a downwardly-extending arm of the yoke 354. The other end of the link 358 is pivotally connected to an arm 366 fulcrumed on a stud 367 in the frame 61. An extension of said arm 366 is normally maintained in contact with an abutment 368 by a spring 369.

One end of a link 370 is pivotally connected to the arm 366 and the other end of said link is slotted to embrace a stud 371 in a crank 372 secured to the zero stop throwout shaft 116. A spring 379 urges the yoke 354 clockwise to normally maintain the roller 353 in contact with the periphery of the cam 351. The operation of this mechanism is as follows:

In single-item transactions and in certain total-taking operations, the single-item keys 208 (Fig. 3) position the plate cam 351 (Fig. 8) so that the low portion of the periphery thereof is opposite the roller 353, and this positioning, by means of the roller 357 and the arm 356, positions the shaft 355 directly in its single-item control position.

In multiple-item transactions, depressing one of the multiple-item keys 205, 206, or 207 (Fig. 3), by means of the differential mechanism here shown, positions the plate cam 351 (Fig 8) so that the high portion of the periphery thereof is opposite the roller 353, to rock the yoke 354 counter-clockwise. This movement of the yoke 354, by means of the train of mechanism shown in Fig. 8, rocks the shaft 355 counter-clockwise. The shaft 355 remains in this position until during the latter part of the first cycle of the compulsory clearing operation following the multiple-item entering operations.

In the final clearing operation of a multiple-item transaction, the mechanism shown in Fig. 7, which, as previously explained, imparts mechanical clockwise movement to the zero stop throwout shaft 116, as viewed in Fig. 7, and counter-clockwise movement to said shaft as viewed in Fig. 8, causes the crank 372 in cooperation with the link 370 and the arm 366 to shift the link 358 downwardly in the manner explained earlier herein. This causes the stud 357 in the upper end of said link 358, in cooperation with the slots 365 and 359, to shift the arm 356 and the shaft 355 clockwise back to normal position independently of the yoke 354

The link 358 is locked in its downward position by means of a projection 663 thereon, in cooperation with a flat surface on a half-round stud 685 carried by an arm 686 loose on the shaft 188 and urged clockwise by a spring 687 to normally maintain a stud 688 therein in contact with the top surface of a link 689 pivotally connecting a crank 690, secured on the key lock shaft 80, to the upper end of a lever 691 fulcrumed on a stud (not shown) in the frame 61.

Depressing the starting bar 68 (Figs. 6 and 7) releases the key lock shaft 80 to the action of the spring 81, which urges said key lock shaft counter-clockwise, as viewed in Fig. 8, to set the machine in motion. The counter-clockwise movement of the shaft 80 and the crank 690 shifts the link 689 forwardly to move the inclined top edge thereof away from the stud 688 to permit the spring 687 to move the stud 685 into resilient contact with the top surface of the projection 663. Consequently, when the link 358 is shifted downwardly, in the manner explained above, the stud 685 drops behind the projection 663 to block return movement upwardly of said link until the key lock shaft 80 is restored near the end of the multiple-item clearing operation. Restoring movement counter-clockwise of the key lock shaft 80, under influence of the mechanism shown in Fig. 7, shifts the link 689 rearwardly (Fig. 8), causing the inclined upper surface thereof to engage the stud 688 and rock the arm 686 counter-clockwise to disengage the stud 685 from the projection 663 to permit the link 358 to be returned upwardly by the spring 369. The zero stop throwout shaft 116 is restored before the key lock shaft 80 and the slot in the link 370 permits the link 358 to remain stationary while said shaft 116 is being restored.

The positioning of the shaft 355 variably controls the operation of several mechanisms in the machine in single- and multiple-item transactions. Only its control over the releasing and locking of the clerks' keys will be considered herein. Reference may be had to the parent case for details of how the positioning of this shaft controls the operation of the other mechanisms.

*Interlocking mechanism for the clerks' keys*

An interlocking device between the clerks' keys and the key lock shaft prevents releasing the machine for operation in all adding transactions unless a clerk's key is depressed. However, shifting the total control lever away from adding position unlocks the key lock shaft, the same as depressing one of the clerks' keys, and thereby permits reading or resetting.

In total-taking and sub-total-taking operations, it is desirable to be able to release the machine for operations without the necessity of depressing an amount key, and moving the total control lever 123 (Figs. 5 and 9) rocks the shaft 116 and the cam 336 counter-clockwise, causing the camming slot 335, in cooperation with the roller 337, to shift the arm 338 clockwise, which movement is transmitted by the link 339 to the pawl 341 pivoted on the stud 342. Clockwise movement of the pawl 341 causes the stud 340, in cooperation with an arm of a lever 746, to rock said lever counter-clockwise on its pivot 747 fast in the frame 61. A bifurcated arm of the lever 746 straddles a stud 748 secured in an extension of the latch 744 (Fig. 9); consequently, counter-clockwise movement of said lever 746 rocks the latch 744 to permit the releasing of the machine in total-taking operations without the necessity of depressing one or more of the amount keys. When the total control lever is returned to adding position, a spring 749 (Fig. 9) returns the lever 746 clockwise in unison therewith to restore the latch 744 counter-clockwise to effective position, as here shown. For further details of this mechanism, reference may be had to the parent application. In single-item transactions, the depressed clerk's key is released automatically at the end of each machine operation. However, in multiple-item transactions, mechanism controlled by the transaction keys disables the automatic releasing mechanism and locks the clerk's key depressed until the compulsory multiple-item clearing operation. This mechanism is shown best in Figs. 9 and 10 and will now be described.

Each of the clerks' keys 204 (Figs. 2 and 9) carries a stud 697 adapted to cooperate with hook-shaped projections 698 of a locking detent 699 and inclined camming surfaces of a plate 700. The detent 699 and the plate 700 are mounted for radial movement on studs 701 and 702 fast in the clerks' key frame 234. Springs 703 and 704 urge the detent 699 and the plate 700 clockwise and counter-clockwise, respectively, to normally maintain the ends of radial slots therein in contact with the studs 701 and 702.

Depressing one of the clerks' keys 204 causes the stud 697, in cooperation with an angular camming surface on the projection 698, to shift the detent 699 counter-clockwise until said stud 697 passes beyond the hook-shaped portion of the projection 698. The spring 703 then returns said detent 699 clockwise to cause the hook-shaped portion thereof to latch over a flat surface of the stud 697 to retain the clerk's key depressed. In case the wrong clerk's key is inadvertently depressed, depressing the correct clerk's key releases the previously depressed key by shifting the detent 699 counter-clockwise and return movement clockwise of said detent under action of the spring 703 retains the correct clerk's key depressed.

Figure 2:
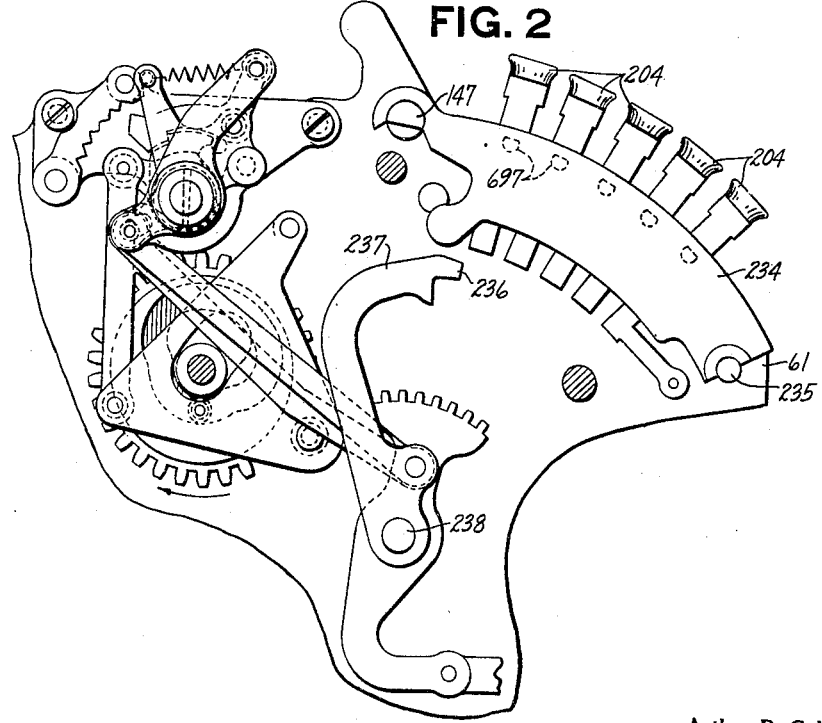
Fig. 2 is a left side elevation of the clerk's bank and its associated differential mechanism.

The detent 699 carries a stud 705 which cooperates with the upper end of a lever 706 fulcrumed on a stud 707 secured in the key frame 234 (Fig. 2). The other end of the lever 706 cooperates with a stud 708 in an extension of a lever 709 rotatable on a stationary stud 715 in the printer frame, not shown herein. An extension 716 of the lever 709 cooperates with a stud 717 in a crank 718 fast on the key lock shaft 80. The lever 709 carries a stud 719 embraced by a bifurcated arm of a bell crank 720 pivoted on a stud 721 in the printer frame, not shown herein. Another arm of the bell crank 720 has connected thereto one end of a link 722, the other end of which is slotted to receive a stud 723 in a downward extension of the lever 585 fastened to shaft 355. A spring 724 stretched between the link 722 and an extension of the lever 585 urges said link 722 forwardly to normally maintain the stud 723 in contact with the end of the slot in said link to position the bell crank 720 and the lever 709.

When the mechanism shown in Fig. 7 imparts clockwise movement to the key lock shaft 80, as viewed in Fig. 9, near the end of machine operations to release the depressed keys, such movement causes the stud 717 in the crank 718 to engage the projection 716 and rock the lever 709 counter-clockwise against tension of the spring 724. Counter-clockwise movement of the lever 709 causes the stud 708 to rock the lever 706 also counter-clockwise, to cause the upper end of said lever, in cooperation with the stud 705, to shift the detent 699 rearwardly or counter-clockwise to release the depressed clerk's key. The clerk's keys are automatically released in this manner in all single-item transactions and in all reading and resetting operations. However, in multiple-item transactions, counter-clockwise movement of the shaft 355 (Figs. 8 and 9) caused by the high portion of the periphery of the cam 351, which is positioned opposite the roller 353 by the depression of any of the multiple-item transaction keys 205, 206, or 207 (Figs. 1 and 3), rocks the lever 585 (Fig. 9) in unison therewith to shift the link 722 forwardly. This, by means of the bell crank 720, rocks the key releasing lever 709 clockwise to move the projection 716 thereof out of the path of the stud 717 and to move the stud 708 out of contact with the lower end of the lever 706. This prevents the depressed clerk's key from being released upon clockwise releasing movement of the key lock shaft 80 near the end of multiple-item entering operations.

However, it is desirable to have the depressed clerk's key released in the final clearing operation of a multiple-item transaction, and this is accomplished by the downward shifting of the link 358 (Fig. 8) under influence of the zero stop throwout shaft 116, which, as brought out hereinbefore, shifts the shaft 355 and the lever 585 (see also Fig. 9) independently of the yoke 354. Clockwise movement of the shaft 355 and the lever 585 returns the release lever 709 counter-clockwise to again move the projection 716 thereof in the path of the stud 717 so that clockwise releasing movement of the shaft 80 will release the depressed clerk's key during the last cycle of a multiple-item clearing operation.

A hook 725 (Figs. 9 and 10) connected to the lever 709 is adapted to cooperate with an abrupt surface 726 cut in the periphery of a locking plate 727 loose on the key lock shaft 80 and spring-urged clockwise to normally maintain a stud 728 carried thereby in contact with a finger 729 of an arm 730 secured on the shaft 80. Counter-clockwise releasing movement of the shaft 80, caused by the spring 81 (Fig. 7) when the starting bar 68 is depressed, causes the arm 730, in cooperation with the stud 728, to move the locking plate 727 in unison therewith to move the abrupt surface 726 thereof below the hook 725 connected to the lever 709, whereupon clockwise movement of said lever 709, under influence of the shaft 355 and the lever 585, in the first item-entering operation of a multiple-item transaction, causes said hook 725 to latch over the abrupt surface 726 to latch the plate 727 in the position indicated by dot-and-dash lines in Fig. 10. This retains a projection 731 of the plate 727 in the path of an extension 732 of the locking detent 699 to obstruct counter-clockwise releasing movement of said detent to lock the depressed clerk's key and to prevent the depression of another clerk's key during a multiple-item transaction. In the final clearing operation of a multiple-item transaction, clockwise movement of the shaft 355 and the lever 585 under influence of the link 358 (Fig. 8) disengages the hook 725 on the lever 709 from the abrupt surface 726 and permits the locking plate 727 to be spring-returned clockwise until the stud 728 again contacts the projection 729.

When the machine is at rest, the projection 731 (Fig. 10) in cooperation with the extension 732 likewise prevents releasing the machine for operation when a clerk's key is partially depressed. Partially depressing a clerk's key 204 (Figs. 9 and 10) rocks the detent 699 counter-clockwise to move the extension 732 above and in the path of the projection 731, which, by means of the stud 728 and the projection 729, obstructs counter-clockwise releasing movement of the shaft 80 until the clerk's key is fully depressed.

In all adding operations, including single-item operations and the item-entering operations of multiple-item transactions, a tooth 733 (Figs. 4, 9, and 10) of the plate 727, in cooperation with the tooth of a latch 734 pivoted on the stud 707 and bifuracted on its upper end to straddle a stud 735 in the plate 700, obstructs clockwise releasing movement of the shaft 80 unless a clerk's key 204 is depressed. Depressing a clerk's key 204 causes the pin 697 therein, in cooperation with the inclined camming surface of the corresponding notch in the plate 700, to move said plate clockwise to shift the tooth of the latch 734 out of the path of the tooth 733, to permit the machine to be released for operation.

Moving the total control lever 123 (Fig. 5) away from adding position, by means of the mechanism here shown, imparts a slight counter-clockwise movement to the zero stop throwout shaft 116, as viewed in Fig. 9, causing a raised surface 736 of the cam 336, secured on said shaft, in cooperation with a roller 737 on a pitman 738, to shift said pitman upwardly. The pitman 738 is bifurcated at its lower end to straddle the shaft 116, while the upper end thereof is connected to a lever 739 loose on the rod 235 (Fig. 2), which supports the lower end of the clerk's key frame 234. Upward movement of the pitman 738 rocks the lever 739 clockwise, causing a projection thereof, in cooperation with a stud 740 secured in an extension of the plate 700, to move said plate clockwise or downwardly to rock the tooth of the latch 734 (Fig. 4) out of the path of the tooth 733 in the plate 727 to permit releasing of the machine for total-taking operations without the necessity of depressing a clerk's key.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, adapted to perform multiple-item transactions consisting of item-entering operations and a final clearing operation, the combination of depressible control keys; a shaft adapted to be rocked back and forth each machine operation; a shiftable plate to retain the control keys depressed; means interposed between the plate and the shaft whereupon rocking movement of said shaft shifts the plate to release the depressed control key; means effective in multiple-item entering operations to move a part of the interposed means to ineffective position to prevent the rocking movement of the shaft from causing the release of the depressed control key; and means effective in multiple-item clearing operations and cooperating with the moving means to return the part of the interposed means to effective position to cause the depressed control key to be released.

2. In a machine of the class described, the combination of depressible control keys; a shiftable plate to retain the control keys depressed; a shaft, adapted to be rocked in one direction to set the machine in motion and in another direction to release the depressed control keys; means interposed between the shaft and the plate, to transmit releasing movement of the shaft to shift the plate to release the depressed control keys, said means including a rockable member shiftable to a position to disable the transmission of the movement of the shaft to the plate; an element on the shaft, moved to a position under control of the shaft, when the shaft is operated in one direction, to obstruct movement of the plate to prevent the depression of another control key; a retaining arm fastened to said rockable member; and means to shift the rockable member to render the key releasing movement of the shaft ineffective to move the plate and to cause said retaining arm to retain the element in effective position to prevent the depression of another control key irrespective of the movement of the shaft.

3. In a machine of the character described, the combination of depressible control keys; a shiftable plate to retain the control keys depressed; a shaft movable in each machine operation in a direction to shift the plate to release the depressed control key; means to transmit the movement of the shaft to the shiftable plate; means effective in certain operations to shift a part of the transmitting means to disable the transmitting means and prevent the release of the depressed control key; blocking means shiftable to a position to engage the plate and prevent the depression of another control key; and means connected to said part, and operable when the part is shifted, to retain the blocking means in position as long as the transmitting means is disabled.

4. In a machine of the character described, adapted to perform multiple-item transactions consisting of item-entering operations and a final clearing operation, the combination of depressible control keys; a shaft adapted to be rocked back and forth each machine operation, initial movement thereof to set the machine in motion and final movement to release the depressed control keys; a shiftable plate to retain the control keys depressed; connections normally coupling the shiftable plate to the shaft whereupon final movement of said shaft rocks the plate to release the depressed control key; an element on the shaft movable with the shaft upon initial movement thereof, to a position to obstruct movement of the plate to lock the control keys against further operation; means connected to a part of the connections; means effective in multiple-item entering operations to shift said part of the connections to render final movement of the shaft ineffective and to cause said means connected to the part of the connections to engage the element to retain the element in obstructing position; and means effective in multiple-item clearing operations to return the part of the connections and the means connected thereto back to normal position.

ARTHUR R. COLLEY.
JOHN B. GEERS.